(12) United States Patent
Boschma, Jr. et al.

(10) Patent No.: US 7,163,177 B1
(45) Date of Patent: Jan. 16, 2007

(54) AIRSHIP BALLAST SYSTEM

(75) Inventors: James H. Boschma, Jr., Huntsville, AL (US); Callum R. Sullivan, New Market, AL (US); Michael McNabb, Huntsville, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 164 days.

(21) Appl. No.: 11/064,313

(22) Filed: Feb. 23, 2005

(51) Int. Cl.
*B64B 1/70* (2006.01)

(52) U.S. Cl. .............................. 244/95; 244/97; 165/41

(58) Field of Classification Search ............ 244/95–99, 244/65, 57, 58, 53 R; 165/41, 121, 126, 165/185, 80.3; 416/20 R, 20 A; 123/41.31, 123/41.01, 41.29; 60/309; 210/669, 900
See application file for complete search history.

(56) References Cited

U.S. PATENT DOCUMENTS

| | | | | |
|---|---|---|---|---|
| 1,653,603 A | * | 12/1927 | Schroder | 244/95 |
| 1,853,376 A | * | 4/1932 | Powelson et al. | 244/93 |
| 2,018,535 A | * | 10/1935 | Rober | 165/41 |
| 2,310,767 A | * | 2/1943 | Durr | 244/95 |
| 2,330,632 A | * | 9/1943 | Seligman | 165/86 |
| 3,204,401 A | * | 9/1965 | Serriades | 60/263 |
| 3,927,526 A | * | 12/1975 | Tedrow | 123/41.31 |
| 3,930,625 A | * | 1/1976 | Krivka | 244/17.21 |
| 4,813,632 A | | 3/1989 | Woodhouse | |
| 5,537,974 A | | 7/1996 | Palmer | |
| 5,722,249 A | | 3/1998 | Miller, Jr. | |
| 5,816,181 A | | 10/1998 | Sherman, Jr. | |
| 6,650,541 B1 | * | 11/2003 | Simon et al. | 361/697 |

* cited by examiner

*Primary Examiner*—Galen Barefoot
(74) *Attorney, Agent, or Firm*—Nydegger & Associates

(57) ABSTRACT

An airship ballast system includes an engine driven propeller and a cooling tube that is positioned coplanar with the propeller and outside its tip path. One end of the cooling tube is connected to receive exhaust gases from the engine while the other end is connected to a ballast tank. In operation, exhaust gases from the engine are cooled as they transit the cooling tube, and water condensed from the cooled exhaust gases is pumped to the ballast tank to maintain a ballast for the airship.

20 Claims, 1 Drawing Sheet

AIRSHIP BALLAST SYSTEM

FIELD OF THE INVENTION

The present invention pertains generally to systems and methods for maintaining ballast for a propeller-driven, lighter-than-air airship. More particularly, the present invention pertains to an airship ballast system wherein ballast is provided by condensed water that is scavenged from engine exhaust gases. The present invention is particularly, but not exclusively, useful as a system and method for maintaining ballast for an airship wherein the condensation of water from engine exhaust gases is enhanced by the action of propeller induced airflow.

BACKGROUND OF THE INVENTION

An important factor for consideration in the flight of a lighter-than-air airship is its reliance on ballast to maintain flight at a selected flight level. Also, the ability of the airship to climb and descend is dependent on the control of the airship's ballast. It also happens that as the duration of flight is increased, the consequent increase in fuel burn exacerbates the ability to control the airship's ballast. In sum, the loss of fuel during an extended flight, without any ballast correction, can significantly increase the difficulty of descent, the landing of the airship, and the safe handling of the airship by a ground crew.

As is well known, the combustion of fuel in an air-breathing, reciprocating engine is accompanied by a marked increase in the temperature of the air that is mixed with the fuel for combustion. It is also well known that as air is cooled, water vapors in the air are condensed, and are removed from the air as liquid water. On this point, data is available which indicates that the weight of water that can be condensed from the exhaust gases of an air-breathing, reciprocating engine can equal, or even exceed, the weight of fuel that is burned.

Propeller theory clearly indicates that as a propeller is rotated, it draws air with increased velocity into the plane of the propeller rotation. The velocity of the air is then further increased as it passes through the propeller. At the same time, vortices are created at the tip of each propeller blade. The combined effect of all this is that air is moved with an increased velocity within a determinable distance beyond the tip of the propeller's rotating blades. From a thermodynamic perspective, it is also known that increased airflow velocities, such as are induced by a propeller rotation, can be used to enhance the cooling effect of an air mass.

In light of the above it is an object of the present invention to provide a system and method for maintaining the ballast of an engine-driven, lighter-than-air airship that uses condensed water from engine exhaust gases for ballast. Another object of the present invention is to provide a system and method for maintaining the ballast of an airship that employs the increase in airflow around and through a rotating, engine-driven propeller to enhance water condensation from engine exhaust gases. Still another object of the present invention is to provide a system and method for maintaining the ballast of an airship that is simple to use, relatively easy to manufacture, and comparatively cost effective.

SUMMARY OF THE INVENTION

In accordance with the present invention, a system and method for maintaining ballast for a lighter-than-air airship includes an air-breathing engine (motor) and an assembly for recovering condensed water from the engine's exhaust gases. The condensed water is then transferred to a ballast tank, where the water level in the tank is monitored to maintain ballast for the airship.

As a component of the present invention, an air-breathing, combustion engine is mounted on the airship to rotate a propeller that provides thrust for moving the airship. More particularly, the propeller is rotated by the engine around an axis. As it rotates, the tips of the propeller blades define a tip path at a distance "r" from the axis of propeller rotation.

A cooling tube is also mounted on the airship, and is positioned around the propeller to be substantially coplanar with the propeller tip path. As so positioned, the cooling tube is located at a distance "d" from the axis of propeller rotation that is greater than the distance "r" of the tip path from this axis. Operationally, the arrangement of the cooling tube around the propeller provides protection for ground personnel who may be working near the propeller. Structurally, the cooling tube has a first end that is connected in fluid communication with the engine (motor) to receive engine exhaust gases from the engine for transfer through the cooling tube. The second end of the cooling tube is then connected in fluid communication with an intercooler which, in turn, is connected in fluid communication with the ballast tank mentioned above.

In operation, exhaust gases from the engine (motor) transit through the cooling tube where they are cooled by external airflow over the cooling tube. Cooling vanes mounted on the outside surface of the cooling tube may be added to enhance the cooling effect of the cooling tube. In any event, water is condensed from the exhaust gases as they are cooled in the cooling tube. This condensation process is continued in the intercooler. The condensed water is then scavenged from the cooling tube, and from the intercooler, for transfer to the ballast tank. As this water is transferred to the ballast tank, the now water-depleted exhaust gases are vented to the atmosphere.

As indicated above, a ballast tank is mounted on the airship. Specifically, the ballast tank is connected in fluid communication with the cooling tube, and with the intercooler, for receiving the water that has been condensed from the engine's exhaust gases. Further, this ballast tank includes a dump valve that is selectively operable to dump water from the ballast tank, to thereby maintain a desirable ballast for the airship. In detail, this is done by monitoring a water level in the ballast tank, and simultaneously monitoring a fuel level in the engine's fuel tank. The water level in the ballast tank is then compared with the fuel level in the fuel tank to obtain an instantaneous ratio. The dump valve can then be selectively activated to dump water from the ballast tank when the instantaneous ratio exceeds a scheduled value. As contemplated by the present invention, the comparison of water and fuel levels, and the consequent selective activation of the dump valve can be accomplished either manually or by a computer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
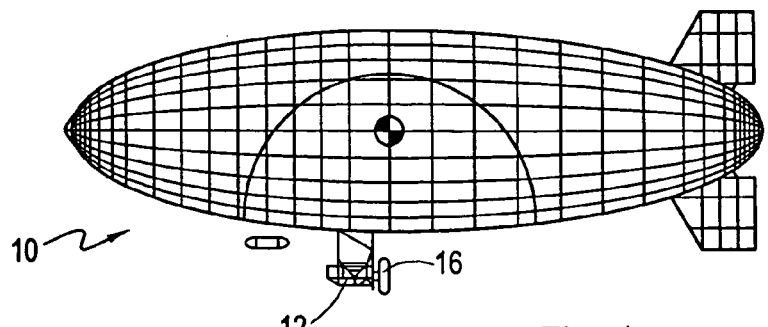
FIG. 1 is an elevation side view of an airship in accordance with the present invention.

Referring initially to FIG. 1, an airship in accordance with the present invention is shown and is generally designated 10. As shown, the airship 10 may be either rigid or non-rigid and includes an engine (motor) 12 that is used to rotate a propeller 14 (best seen in FIG. 2). FIG. 1 also shows that the propeller 14 may be surrounded by a shroud 16. Preferably, the engine 12 for the airship 10 is an air-breathing, reciprocating engine of a type well-known in the pertinent art.

Figure 2:
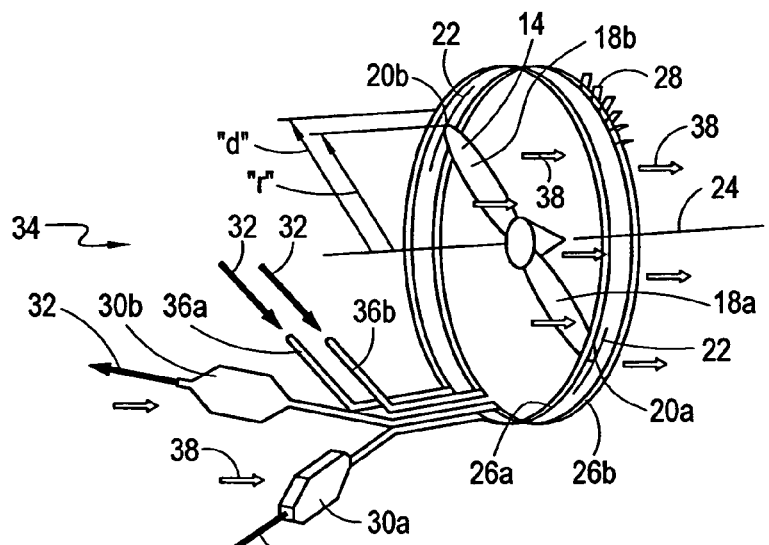
FIG. 2 is a perspective view of the exhaust gas cooling components of the present invention.

FIG. 2 shows that the propeller 14 includes blades 18, of which the blades 18a and 18b are only exemplary. Further, each blade 18a,b has a respective tip 20a,b which travels along a tip path 22 as the propeller 14 is rotated about an axis 24 by the engine (motor) 12. As indicated, each blade 18a,b is a distance "r" in length and, correspondingly, the tip path 22 is at a distance "r" from the rotation axis 24.

Still referring to FIG. 2, it will be seen that the present invention includes a plurality of substantially circular cooling tubes 26, of which the cooling tubes 26a and 26b are exemplary. As contemplated by the present invention, however, it is possible to use only one cooling tube 26 or, alternatively, more than two cooling tubes 26. Nevertheless, for purposes of this disclosure, the airship 10 is considered to have two cooling tubes 26a and 26b. As shown, the circular cooling tubes 26a,b are centered on the axis 24 and are positioned substantially coplanar with the rotational plane of the propeller 14. More specifically, it is recognized that for a plurality of cooling tubes 26, some of the cooling tubes 26 may define a plane that is substantially parallel to the plane of the tip path 22. Recognizing this minor variation, each cooling tube 26 can still be considered as being substantially coplanar with the tip path 22. In any event, each cooling tube 26 is located at a distance "d" from the axis 24. Importantly, the distance "d" is greater than the distance "r" of the tip path 22 from the rotation axis 24. Thus, the cooling tubes 26 are positioned to protect personnel from the propeller 14 as it rotates.

As indicated in FIG. 2, each cooling tube 26 can include a plurality of vanes 28. For the present invention, the purpose of the vanes 28 are two-fold. For one, they can be used to enhance the cooling capability of the cooling tube 26. For another, the vanes 28 can be employed to provide additional structural support for the cooling tubes 26. In another aspect, each of the cooling tubes 26a,b is connected with a respective intercooler 30a,b.

Figure 3:
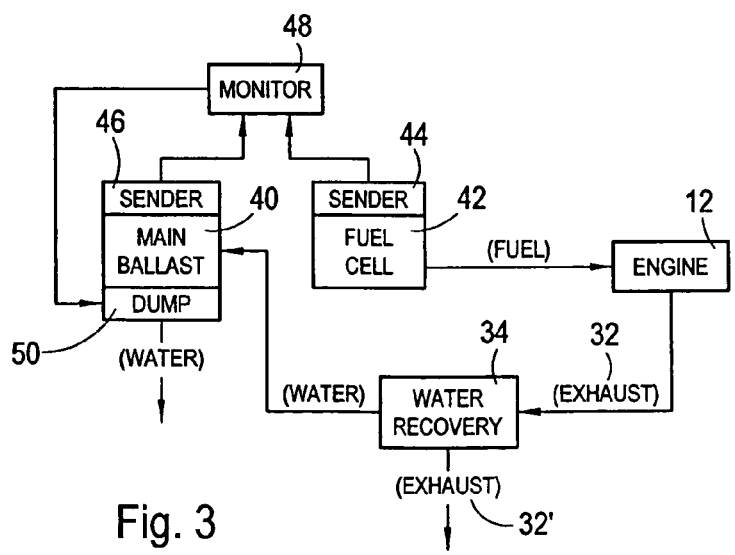
FIG. 3 is a functional flow chart of the process components involved in the operation of the present invention.

The operation of the present invention will, perhaps, be best appreciated by cross referencing FIG. 3 with FIG. 2. As intended for the operation of the airship 10, the engine (motor) 12 is run to rotate the propeller 14. A consequence of this is that the engine 12 generates exhaust gases 32. These exhaust gases 32 are then sent to a water recovery unit 34 that is mounted on the airship 10. Specifically, the water recovery unit 34 for the present invention is a combination of the elements disclosed above, which are shown and collectively designated 34 in FIG. 2.

In detail, the exhaust gases 32 are directed from the engine 12 to intakes 36a and 36b, which are respectively connected in fluid communication with the cooling tubes 26a and 26b. The exhaust gases 32 then traverse through the cooling tubes 26a and 26b. As they do so, airflow (indicated in FIG. 2 by the arrows 38) over the cooling tubes 26a and 26b and the vanes 28 (if used) will cool the exhaust gases 32. During this cooling, water vapors in the exhaust gases 32 condense as liquid water. This process of cooling and condensation then continues in the intercoolers 30a,b after the exhaust gases 32 have passed through the cooling tubes 26a,b. As will be appreciated by the skilled artisan, the airflow 38 that cools the exhaust gases 32 in the cooling tubes 26a,b, and in the intercoolers 30a,b, is created by the operation of the propeller 14, as well as by in-flight movements of the airship 10.

After passing through the cooling tubes 26a,b and the intercoolers 30a,b, the cooler exhaust gases 32', with water removed, are then vented to the atmosphere. On the other hand, as shown in FIG. 3, the water that has been scavenged and removed from the exhaust gases 32 is transferred to a main ballast tank 40.

With the above in mind, it will be appreciated that ballast for the airship 10 becomes a trade-off between the amount of fuel from fuel cell 42 that is burned by the engine 12, and the amount of water that is recovered by the recovery unit 34. Accordingly, the fuel cell 42 is provided with a sender 44 that indicates the amount of fuel (fuel level) remaining in the cell 42. Similarly, the ballast tank 40 is provided with a sender 46 that indicates the amount of water (water level) in the ballast tank 40. The information from both sender 44 and sender 46 is then transmitted to a monitor 48. The instantaneous ratio (fuel level)/(water level) can then be continuously evaluated by the monitor 48 to indicate whether ballast is being maintained for the airship 10. If not, corrective action may be taken. Specifically, if the ratio (fuel level)/(water level) ever exceeds a scheduled value, a dump valve 50 in the ballast tank 40 can be activated. This action dumps water from the ballast tank 40, to thereby maintain ballast for the airship 10.

While the particular Airship Ballast System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An airship ballast system which comprises:
  a propeller having a plurality of blades with each blade having a tip:
  a motor mounted on the airship for rotating the propeller around an axis, wherein the motor generates exhaust gases and the propeller defines a tip path at a distance "r" from the axis;
  a cooling tube mounted on the airship and positioned substantially coplanar with the propeller tip path at a distance "d" from the axis, wherein the distance "d" is greater that the distance "r", and further wherein the cooling tube has a first end and a second end, with the first end of the cooling tube connected in fluid communication with the motor to receive the exhaust gases from the motor for transit through the cooling tube to cool the exhaust gases and condense water therefrom in the cooling tube; and
  a ballast tank mounted on the airship, the ballast tank being connected in fluid communication with the second end of the cooling tube for receiving condensed water therefrom to maintain a ballast for the airship.

2. A system as recited in claim 1 further comprising an intercooler positioned in fluid communication between the second end of the cooling tube and the ballast tank to provide additional cooling of the exhaust gases for condensation of water therefrom and for transfer to the ballast tank.

3. A system as recited in claim 1 wherein the cooling tube has an outer surface and the system further comprises cooling vanes mounted on the outer surface of the cooling tube.

4. A system as recited in claim 1 further comprising a dump valve mounted on the ballast tank, wherein the dump valve is selectively operable to dump water from the ballast tank.

5. A system as recited in claim 4 further comprising:
a fuel tank for the motor;
a means for monitoring a water level in the ballast tank;
a means for monitoring a fuel level in the fuel tank;
a means for comparing the water level in the ballast tank with the fuel level in the fuel tank to obtain an instantaneous ratio thereof; and
a means for activating the dump valve to dump water from the ballast tank when the instantaneous ratio exceeds a scheduled value.

6. A system as recited in claim 5 wherein the water level monitoring means, the fuel level monitoring means and the comparing means comprise a computer.

7. A system as recited in claim 1 further comprising a plurality of cooling tubes.

8. A system as recited in claim 1 wherein a difference between the distance "d" and the distance "r" is greater than one inch.

9. A system as recited in claim 1 further comprising a shroud mounted on the airship and wherein the cooling tube is mounted on the shroud.

10. A ballast system for an airship which comprises:
a ballast tank mounted on the airship;
a propeller;
a motor mounted on the airship and connected with the propeller for rotating the propeller in a plane, around an axis;
an intake for receiving exhaust gases from the engine;
a cooling tube mounted on the engine and positioned in the plane to circumscribe the propeller, the cooling tube having a first end and a second end, with the first end thereof in fluid communication with the intake to pass exhaust gases from the engine through the cooling tube;
an intercooler connected to the second end of the cooling tube to scavenge condensed water from the exhaust gases for transfer of the condensed water from the intercooler to the ballast tank; and
a means for selectively dumping water from the ballast tank to provide ballast for the airship.

11. A system as recited in claim 10 wherein the motor is an air-breathing, reciprocating engine.

12. A system as recited in claim 10 further comprising a dump valve mounted on the ballast tank, wherein the dump valve is selectively operable to dump water from the ballast tank.

13. A system as recited in claim 12 further comprising:
a fuel tank for the motor;
a means for monitoring a water level in the ballast tank;
a means for monitoring a fuel level in the fuel tank;
a means for comparing the water level in the ballast tank with the fuel level in the fuel tank to obtain an instantaneous ratio therefore; and
a means for activating the dump valve to dump water from the ballast tank when the instantaneous ratio exceeds a scheduled value.

14. A system as recited in claim 13 wherein the water level monitoring means, the fuel level monitoring means and the comparing means comprise a computer and the system further comprises a plurality of cooling tubes.

15. A system as recited in claim 10 wherein the propeller defines a tip path at a distance "r" from the axis and the cooling tube is positioned substantially coplanar with the propeller tip path at a distance "d" from the axis, wherein the distance "d" is greater that the distance "r".

16. A system as recited in claim 15 wherein a difference between the distance "d" and the distance "r" is greater than one inch.

17. A system as recited in claim 10 further comprising a shroud mounted on the airship and wherein the cooling tube is mounted in the shroud.

18. A method for providing ballast for an airship which comprises the steps of:
rotating a propeller driven by an air-breathing, reciprocating engine;
collecting exhaust gases from the engine;
passing collected exhaust gases through a cooling tube, wherein the cooling tube is positioned in the vortices generated by the tip of the rotating propeller to cool the exhaust gases and condense water therefrom in the cooling tube;
transferring condensed water from the cooling tube to a ballast tank; and
dumping water from the ballast tank to maintain a scheduled water level therein.

19. A method as recited in claim 18 further comprising the steps of:
monitoring a water level in the ballast tank;
providing a fuel tank for the engine;
monitoring a fuel level in the fuel tank;
comparing the water level in the ballast tank with the fuel level in the fuel tank to obtain an instantaneous ratio thereof; and
activating a dump valve to dump water from the ballast tank when the instantaneous ratio exceeds a scheduled value.

20. A method as recited in claim 18 wherein the engine rotates the propeller around an axis and the propeller defines a tip path at a distance "r" from the axis, and wherein the cooling tube is positioned substantially coplanar with the propeller tip path at a distance "d" from the axis, wherein the distance "d" is greater that the distance "r".

* * * * *